Sept. 24, 1957 F. L. FISCHER 2,807,169
MECHANISM FOR CAGING AND PRESETTING GYROSCOPES
Filed Feb. 29, 1956
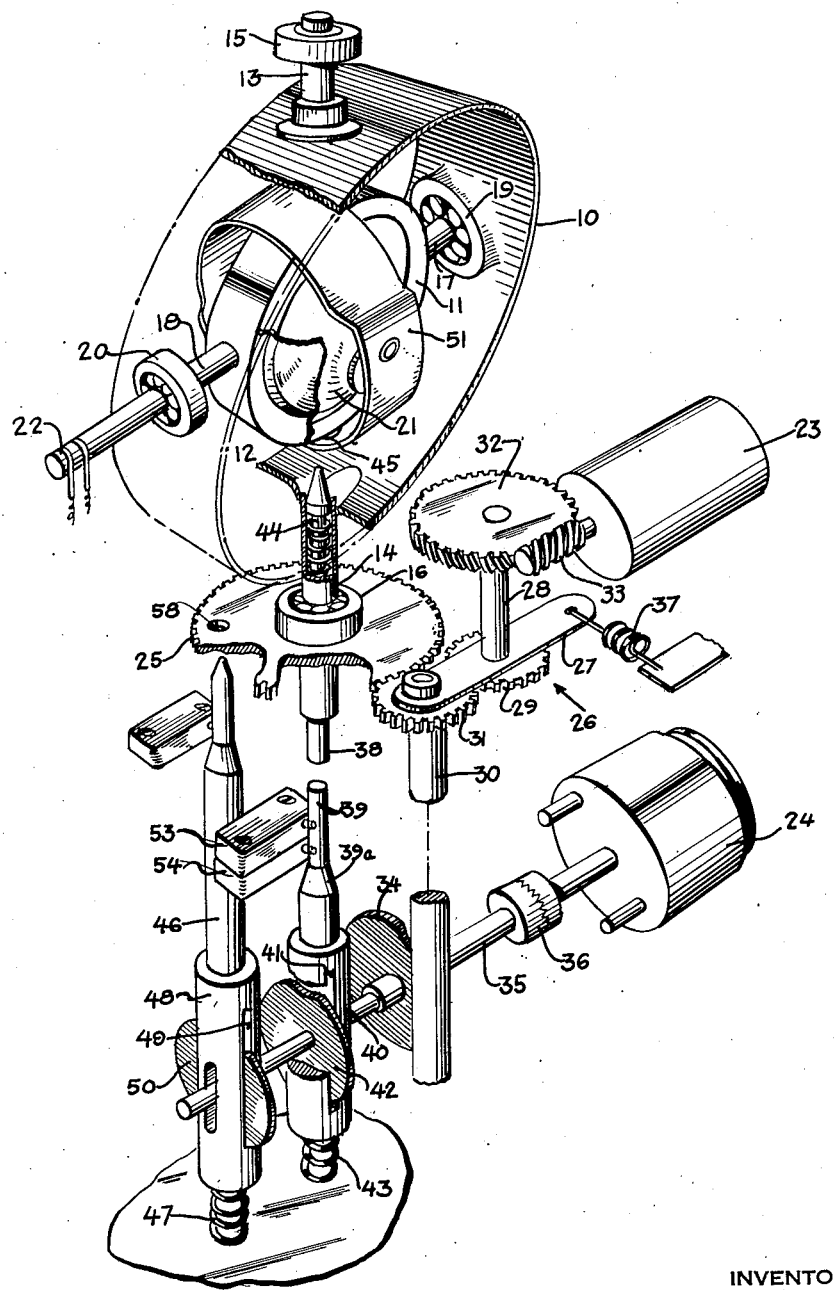
INVENTOR
Franz L. Fischer
BY
ATTORNEY Patented Sept. 24, 1957

2,807,169

MECHANISM FOR CAGING AND PRESETTING GYROSCOPES

Franz L. Fischer, Jackson Heights, N. Y., assignor to Bulova Research and Development Laboratories, Inc., Woodside, N. Y., a corporation of New York Application February 29, 1956, Serial No. 568,516

8 Claims. (Cl. 74—5.14)

The present invention relates generally to gyroscopic devices and more particularly to improved mechanisms for caging and presetting free gyroscopes.

The principal object of this invention is to provide means for caging free gyroscopes by remote control to a preselected attitude. In accordance with the invention, the rotor axis of the gyroscope may be oriented about one or both gimbal axes to a predetermined caging position, means being provided for releasably locking or caging the rotor axis in that position. A particular advantage of the caging mechanism is that it is power-operated and may be controlled electrically from a position remote from the gyroscope itself.

Another object of the invention is to provide a novel mechanism for caging the gyroscope rotor when the rotor is spinning and for presetting the rotor when it is at rest or in spinning motion, the mechanism being operable irrespective of the angle of departure of the rotor from its center position.

Yet another object of the invention is to provide a caging mechanism capable of correctly orienting the gyroscope gimbals from any initial position within 360° of movement.

The caging mechanism according to the invention is adapted to operate in conjunction with a gyroscope having a rotor spinning in a support about one axis and gimbals mounting the support for freedom about perpendicular axes other than the spinning axis. The mechanism is characterized by motor means to apply a torque to the outer gimbal which causes the gyro and the inner gimbal to precess into the caged position whereupon the inner gimbal is locked. A continuance of the torque from the motor on the outer gimbal turns the latter to its caging position where it in turn is also locked. After uncaging the outer gimbal, it may be preset, as desired.

A significant advantage of the invention is that it does not depend on the action of heart-shaped cams as driven members, as in the case in prior art devices. Instead the inner gimbal is rotated by the gyro itself as it precesses as a result of the torque applied to the motor through a gear train to the outer gimbal. The outer gimbal is positively rotated by the motor either for caging or presetting, and as the inner gimbal is locked, there is no gyroscopic resistance to this rotation.

Yet another object of the invention is to provide a caging and presetting mechanism of simple and efficient mechanical design. A mechanism in accordance with the invention is highly reliable in operation and may be constructed at a low cost.

For a better understanding of the invention as well as other objects and further features thereof, reference is had to the accompanying drawing whose single figure illustrates in perspective a gyroscope and a caging and presetting mechanism therefor in accordance with the invention.

Referring now to the drawing, there is shown a gyroscope whose major elements comprise an outer gimbal 10, an inner gimbal 11 and an electrically operated rotor 12. Outer gimbal 10 is mounted for oscillation about a vertical axis by trunnions 13 and 14 supported in suitable bearings 15 and 16, the lower trunnion being of tubular construction. Inner gimbal 11 is mounted for oscillation within outer gimbal 10 about a horizontal axis by trunnions 17 and 18 journalled in bearings 19 and 20 at diametrically opposed positions on the outer gimbal.

Gyro rotor 12 is supported within inner gimbal 11 by means of suitable cones 21, one of which is visible in the drawing, the spin axis of the rotor being perpendicular to the rotational axis of the inner gimbal. Electrical power is supplied to the rotor by means of brushes which engage slip rings 22 encircling trunnion 18.

The caging and presetting mechanism which is disposed below the gyroscope is operated by an electrical motor 23 of any suitable design energized by direct or alternating current, the motor acting in conjunction with a rotary stepping solenoid 24.

Outer gimbal 10 may be rotated by means of a main gear 25 keyed to the lower trunnion 14. Gear 25 is selectively coupled to motor 23 or disengaged therefrom by means of a retractable coupling device, generally designated by numeral 26.

Coupling device 26 includes a lever arm 27 pivoted about a shaft 28 extending perpendicularly through the arm at about its mid-point, a gear 29 being secured to the shaft at the underside of the lever arm. Mounted on a post 30 secured to one end of the lever arm and projecting perpendicularly therebelow is a coupling gear 31 which intermeshes with gear 29. Connected to the other end of lever arm 27 is a spring 37 which is arranged to bias the arm so as normally to urge coupling gear 31 into intermeshing relationship with main gear 25. Keyed to the upper end of shaft 28 is a gear 32 which engages a worm gear 33 secured to the armature shaft of motor 23.

Thus when the motor armature rotates, worm gear 33 drives gear 32, thereby rotating shaft 28 and causing gear 29 to drive the main gear 25 through coupling gear 31. In this way outer gimbal 10 is caused to rotate in a direction determined by the rotational direction of motor 23.

To retract coupling device 26 and thereby disengage motor 23 from main gear 25, a cam 34 is provided mounted on a shaft 35 coupled through a suitable clutch 36 to the stepping solenoid 24. The surface of cam 34 bears against post 30, the cam being so shaped that at a predetermined angular position thereof controlled by stepping solenoid 24, the post is forced to swing the lever arm about shaft 28 against the action of spring 37 to an extent disengaging coupling gear 31 from main gear 25.

When in their caged positions gimbals 10 and 11 are locked by sliding plungers which are spring-biased into recesses. The caging of inner gimbal 11 is accomplished by means of a two-part plunger 38, 39, the upper part 38 of which is slidable longitudinally through tubular trunnion 14. The lower part 39 of the plunger which is in axial alignment with the upper part but is separated therefrom is provided with an enlarged cylindrical section 40 having a longitudinal slot 41 therein which accommodates a cam 42. Cam 42 is mounted on shaft 35 which passes through a transverse bore intersecting the longitudinal slot 41 in the cylindrical section 40 of the lower plunger part.

Cam 42 is so shaped that at a predetermined angular position thereof the lower part 39 of the plunger is forced upwardly by a spring 43 bearing against the end thereof. The upward movement of the lower part 39 forces the upper part 38 of the plunger to enter a recess 45 formed in a holding ring 51 affixed to the inner gimbal and having a cam surface, thereby locking the inner gimbal. The tip of the upper part 38 is tapered to facilitate entry into the recess, the upper part 38 being normally maintained within trunnion 14 by means of a helical spring 44. At another predetermined angular position of cam 42, the lower part 39 of the plunger is forced to shift downwardly against the action of spring 43 thereby releasing the upper part 38 from recess 45 and freeing inner gimbal 11. Since the upper part 38 of the plunger is separate from lower part 39, the outer gimbal 10 has complete freedom with respect to plunger 38, 39.

The caging of outer gimbal 10 is effected by means of a slidable plunger 46 which is normally urged upwardly by a spring 47 bearing against the lower end of the plunger. Plunger 46 is provided with a large cylindrical section 48 having a longitudinal slot 49 therein which accommodates a cam 50 mounted on shaft 35, the shaft extending through a transverse opening intersecting slot 49. Cam 50 is so shaped that at a predetermined angular position thereof plunger 46 is permitted to shift upwardly under the action of spring 47 so that its tapered tip enters a recess 58 formed in main gear 25, to lock the gear against rotation.

As evident from the foregoing, when in the caged position, the inner gimbal 11 is locked by plunger 38, 39, and the outer gimbal 10 by plunger 46. To uncage, the plunger which holds the outer gimbal 10 is withdrawn by cam 50, cam 42 withdraws the plunger from the inner gimbal and cam 34 disengages the motor gear.

If now a momentary signal to cage is given to the stepping magnet 24, all cams are advanced one step. Cam 34 allows the coupling device 26 to effect engagement between motor 23 and main gear 25, cam 50 frees the outer gimbal 10 and cam 42 uncages the inner gimbal 11. Cam ring 51 on the inner gimbal has two levels on which the tip of upper plunger part 38 may rest. This difference of levels acting through microswitches 53 and 54 whose actuator pins bear against the surface of the lower plunger part 39 determines the direction in which motor 23 applies its torque and thereafter the gyro precesses so as to reach the caged zero position by the shorter path. It will be noted that the plunger part 39 is provided with a conical portion 39a so that when this portion engages the actuator pin of a microswitch, it operates same.

When the inner gimbal reaches its zero position, the plunger 38 enters the locking recess 45 and closes the switch to make the rotary magnet 24 turn the cams to the next step. This step releases the plunger 46 in readiness to lock the outer gimbal when it has been turned by the motor to zero. When caging is completed, the stepping magnet and motor are both deenergized and the caged signal switch is closed.

If while the gyro is caged a command to preset is given, the stepping magnet 24 advances one step, unlocks the outer gimbal 10 and energizes motor 23 which drives the gyro and outer gimbal round in either direction according to the command signal, up to 50° per second until the desired preset position is reached; at this point the preset signal is discontinued and the motor is stopped, holding the gimbal until the uncage signal is given. When next a momentary signal is given, the stepping magnet makes one more step, withdraws the inner caging plunger 38 and unmeshes the motor gear.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Gyroscopic apparatus provided with presetting and caging mechanism and comprising an outer gimbal, and trunnions pivotally supporting said outer gimbal, at least one of said trunnions being of tubular construction, an inner gimbal pivotally mounted within said outer gimbal and including recess means alignable with said tubular trunnion when said inner gimbal assumes a predetermined angular position, and a plunger slidable within said tubular trunnion and receivable in said recess to cage said inner gimbal, said plunger being constituted by two separate parts whereby said outer gimbal is free to rotate even though said inner gimbal is caged.

2. A gyroscopic apparatus provided with a presetting and caging mechanism comprising an outer gimbal, a pair of trunnions pivotally mounting said outer gimbal, one of said trunnions having a tubular construction, an inner gimbal pivotally mounted within said outer gimbal, a gyro wheel mounted for rotation within said inner gimbal, a holding device secured to said inner gimbal and provided with a first recess alignable with said tubular trunnion when said inner gimbal assumes a predetermined angular position, a main gear secured to said tubular trunnion for effecting rotation of said outer gimbal, said main gear being provided with a second recess, a first plunger slidable within said tubular trunnion and receivable in said first recess to cage said inner gimbal, and a second slidable plunger receivable within said second recess to cage said outer gimbal.

3. A gyroscopic apparatus provided with a presetting and caging mechanism comprising an outer gimbal, a pair of trunnions pivotally mounting said outer gimbal, one of said trunnions having a tubular construction, an inner gimbal pivotally mounted within said outer gimbal, a gyro wheel mounted for rotation within said inner gimbal, a holding device mounted on said inner gimbal and provided with a first recess alignable with said tubular trunnion when said inner gimbal assumes a predetermined angular position, a main gear secured to said tubular trunnion for effecting rotation of said outer gimbal, said main gear being provided with a second recess, a first plunger slidable within said tubular trunnion and receivable in said first recess to cage said inner gimbal, a second slidable plunger receivable within said second recess to cage said outer gimbal, a rotary stepping magnet, and first and second cam means operatively coupled to said magnet and engaging said first and second plungers for selectively operating same to cage said gimbals.

4. Gyroscopic apparatus provided with presetting and caging mechanisms comprising an outer gimbal, trunnions pivotally supporting said outer gimbal, at least one of said trunnions being of tubular construction, an inner gimbal pivotally mounted within said outer gimbal and provided with recess means alignable with said tubular trunnion when said inner gimbal assumes a predetermined angular position, a plunger constituted by two separate parts and slidable within said tubular trunnions and receivable in said recess to cage said inner gimbal, a main gear secured to said tubular trunnion to rotate said outer gimbal, a motor for driving said main gear, and a retractable coupling device for operatively coupling said motor to said main gear.

5. A gyroscopic apparatus provided with a presetting and caging mechanism comprising an outer gimbal, a pair of trunnions pivotally mounting said outer gimbal, one of said trunnions having a tubular construction, an inner gimbal pivotally mounted within said outer gimbal, a gyro wheel mounted for rotation within said inner gimbal, a holding device mounted on said inner gimbal and provided with a first recess alignable with said tubular trunnion when said inner gimbal assumes a predetermined angular position, a main gear secured to said tubular trunnion for effecting rotation of said outer gimbal, said main gear being provided with a second recess, a motor for driving said main gear, a retractable coupling device for operatively coupling said motor to said main gear, a first plunger slidable within said tubular trunnion and receivable in said first recess to cage said inner gimbal, and a second slidable plunger receivable within said second recess to cage said outer gimbal, and means to actuate selectively said plungers.

6. A gyroscopic apparatus provided with a presetting and caging mechanism comprising an outer gimbal, a pair of trunnions pivotally mounting said outer gimbal, one of said trunnions being of tubular construction, an inner gimbal pivotally mounted within said outer gimbal along an axis perpendicular to the axis of rotation of said outer gimbal, a gyro wheel mounted for rotation within said inner gimbal, a holding device mounted on said inner gimbal and provided with a first recess alignable with said tubular trunnion when said inner gimbal assumes a predetermined angular position, a main gear secured to said tubular trunnion for effecting rotation of said outer gimbal, a drive motor for said outer gimbal, a retracting coupling device for effecting engagement between said motor and said main gear, said main gear having a second recess, a first plunger slidable within said tubular trunnion and receivable in said first recess to cage said inner gimbal and a second slidable plunger receivable within said second recess to cage said outer gimbal.

7. A gyroscopic apparatus provided with a presetting and caging mechanism comprising an outer gimbal, a pair of trunnions pivotally mounting said outer gimbal, one of said trunnions being of tubular construction, an inner gimbal pivotally mounted within said outer gimbal along an axis perpendicular to the axis of rotation of said outer gimbal, a gyro wheel mounted for rotation within said inner gimbal, a holding device mounted on said inner gimbal and provided with a first recess alignable with said tubular trunnion when said inner gimbal assumes a predetermined angular position, a main gear secured to said tubular trunnion for effecting rotation of said outer gimbal, a drive motor for said outer gimbal, a retracting coupling device for effecting engagement between said motor and said main gear, said main gear having a second recess, a first plunger slidable within said tubular trunnion and receivable in said first recess to cage said inner gimbal, a second slidable plunger receivable within said second recess to cage said outer gimbal, a stepping rotary magnet, first, second and third cams engaging said first and second plungers and said coupling device respectively, and operatively coupled to said magnet selectively to actuate said plungers and said coupling device.

8. A gyroscopic apparatus provided with a presetting and caging mechanism comprising an outer gimbal, a pair of trunnions pivotally mounting said outer gimbal, one of said trunnions being of tubular construction, an inner gimbal pivotally mounted within said outer gimbal along an axis perpendicular to the axis of rotation of said outer gimbal, a gyro wheel mounted for rotation within said inner gimbal, a holding device mounted on said inner gimbal and provided with a first recess alignable with said tubular trunnion when said inner gimbal assumes a predetermined angular position, a main gear secured to said tubular trunnion for effecting rotation of said outer gimbal, a drive motor for said outer gimbal, a retracting gear coupling device for effecting engagement between said motor and said main gear, and including an actuating post, said main gear having a second recess, a first plunger slidable within said tubular trunnion and receivable in said first recess to cage said inner gimbal, said plunger being constituted by separated portions to permit said outer gimbal to rotate, a second slidable plunger receivable within said second recess to cage said outer gimbal, a stepping rotary magnet, first, second and third cams engaging said first and second plungers and said post respectively and operatively coupled to said magnet selectively to actuate said plungers and said coupling device.

References Cited in the file of this patent
UNITED STATES PATENTS

| | | |
|---|---|---|
| 2,524,553 | Wendt | Oct. 3, 1950 |
| 2,591,741 | Stone | Apr. 8, 1952 |
| 2,727,393 | Summers, Jr. | Dec. 20, 1955 |